(12) United States Patent
Benbanaste et al.

(10) Patent No.: US 10,850,430 B2
(45) Date of Patent: Dec. 1, 2020

(54) PROCESS FOR PRODUCING TACK-FREE HOTMELT MATERIAL AND DEVICE FOR PRODUCING THE SAME

(71) Applicant: ORGANIK KIMYA SANAYI VE TIC. A.S., Istanbul (TR)

(72) Inventors: Viktor Benbanaste, Istanbul (TR); Filiz Öztürk, Istanbul (TR); Oguzhan Calik, Istanbul (TR); Mahmut Alper Er, Istanbul (TR)

(73) Assignee: ORGANIK KIMYA SANAYI VE TIC. A.S., Istanbul (TR)

( * ) Notice: Subject to any disclaimer, the term of this patent is extended or adjusted under 35 U.S.C. 154(b) by 264 days.

(21) Appl. No.: 15/781,984

(22) PCT Filed: Dec. 9, 2016

(86) PCT No.: PCT/EP2016/002080
§ 371 (c)(1),
(2) Date: Jun. 6, 2018

(87) PCT Pub. No.: WO2017/102071
PCT Pub. Date: Jun. 22, 2017

(65) Prior Publication Data
US 2018/0361625 A1    Dec. 20, 2018

(30) Foreign Application Priority Data
Dec. 15, 2015    (EP) .................... 15003567

(51) Int. Cl.
*B29B 13/00* (2006.01)
*B29C 37/00* (2006.01)
(Continued)

(52) U.S. Cl.
CPC ............ *B29B 13/007* (2013.01); *B29B 11/14* (2013.01); *B29B 13/00* (2013.01);
(Continued)

(58) Field of Classification Search
CPC ... B29C 67/02; B29C 67/205; B29C 37/0067; B29C 2043/029; B29C 2043/185;
(Continued)

(56) References Cited

U.S. PATENT DOCUMENTS

| 1,666,730 A | 4/1928 | Breeze, Jr. |
| 1,989,724 A | 2/1935 | Villanyi |

(Continued)

FOREIGN PATENT DOCUMENTS

| DE | 31 11042 A1 | 9/1982 |
| DE | 10 2005 059 486 A1 | 6/2007 |

(Continued)

OTHER PUBLICATIONS

ELVAX 410 Product Data Sheet, 1 page, 2020 (Year: 2020).*
(Continued)

*Primary Examiner* — Joseph S Del Sole
*Assistant Examiner* — Lawrence D. Hohenbrink, Jr.
(74) *Attorney, Agent, or Firm* — McDonnell Boehnen Hulbelt & Berghoff LLP

(57) ABSTRACT

The present invention relates to a process for producing a hot melt adhesive (HMA) material, preferably hot melt pressure sensitive adhesive (HMPSA) material, having a substantially tack-free coating comprising a novel moulding and spraying step, wherein said HMA material, preferably HMPSA material, can be easily handled, packed and transported for further use. In addition, the present invention relates to a corresponding device for producing a hot melt adhesive (HMA) material, preferably hot melt pressure sensitive adhesive (HMPSA) material, having a substantially tack-free coating.

17 Claims, 7 Drawing Sheets

(51) Int. Cl.

| | |
|---|---|
| *B29C 43/00* | (2006.01) |
| *B29C 43/50* | (2006.01) |
| *B29C 67/20* | (2006.01) |
| *B29C 67/02* | (2017.01) |
| *B29C 43/02* | (2006.01) |
| *B29B 11/14* | (2006.01) |
| *C09J 9/00* | (2006.01) |
| *B29K 23/00* | (2006.01) |
| *B29K 75/00* | (2006.01) |
| *B29K 105/00* | (2006.01) |
| *B29K 33/00* | (2006.01) |
| *B29K 33/04* | (2006.01) |
| *B29C 43/18* | (2006.01) |
| *B29B 9/16* | (2006.01) |
| *B29B 9/08* | (2006.01) |
| *B29B 11/06* | (2006.01) |

(52) U.S. Cl.
CPC ........ *B29C 37/0067* (2013.01); *B29C 43/003* (2013.01); *B29C 43/006* (2013.01); *B29C 43/02* (2013.01); *B29C 43/50* (2013.01); *B29C 67/02* (2013.01); *B29C 67/205* (2013.01); *C09J 9/00* (2013.01); *B29B 9/08* (2013.01); *B29B 11/06* (2013.01); *B29B 2009/163* (2013.01); *B29C 2043/029* (2013.01); *B29C 2043/185* (2013.01); *B29C 2043/187* (2013.01); *B29C 2043/5007* (2013.01); *B29C 2043/5038* (2013.01); *B29K 2023/06* (2013.01); *B29K 2023/12* (2013.01); *B29K 2033/04* (2013.01); *B29K 2033/12* (2013.01); *B29K 2075/00* (2013.01); *B29K 2105/0097* (2013.01); *B29K 2105/251* (2013.01); *C09J 9/005* (2013.01); *C09J 2301/304* (2020.08)

(58) Field of Classification Search
CPC ...... B29C 2043/187; B29C 2043/5007; B29C 2043/5038; B29C 43/003; B29C 43/006; B29C 43/02; B29C 43/50; B29B 13/007; B29B 13/00; B29B 11/06; B29B 11/14; B29B 9/08; B29B 2009/163; B29K 2105/0097; B29K 2105/251; C09J 9/00; C09J 9/005

USPC ...................................................... 264/130
See application file for complete search history.

(56) References Cited

U.S. PATENT DOCUMENTS

| | | | |
|---|---|---|---|
| 3,165,567 | A | 1/1965 | Olson |
| 4,576,835 | A | 3/1986 | Gardenier et al. |
| 4,623,589 | A | 11/1986 | Simmonds, Jr. |
| 4,645,537 | A | 2/1987 | Gardenier et al. |
| 4,748,796 | A | 6/1988 | Viel |
| 4,755,245 | A | 7/1988 | Viel |
| 4,774,138 | A | 9/1988 | Gardenier et al. |
| 5,112,552 | A | 5/1992 | Wittmann et al. |
| 5,292,468 | A | 3/1994 | Colombani |
| 5,373,682 | A | 12/1994 | Hatfield et al. |
| 5,865,927 | A * | 2/1999 | Puletti ............... B01J 2/003 156/244.11 |
| 6,230,890 | B1 * | 5/2001 | Waver ............... B65B 63/08 206/447 |
| 6,716,527 | B1 * | 4/2004 | Czmok ............... B01J 2/006 428/403 |
| 2008/0228269 | A1 * | 9/2008 | McLeod ............ A61F 2/30734 623/11.11 |

FOREIGN PATENT DOCUMENTS

| | | |
|---|---|---|
| EP | 0 347 741 A2 | 6/1989 |
| EP | 0 410 914 A1 | 1/1991 |
| EP | 0 469 564 A1 | 2/1992 |
| EP | 0 521 661 A1 | 1/1993 |
| EP | 0 749 820 A1 | 12/1996 |
| JP | S61237433 A | 10/1986 |

OTHER PUBLICATIONS

Extended European Search Report, received from the European Patent Office, dated Apr. 7, 2016, for European Application No. 15003567.3, pp. 1-10.
International Search Report and Written Opinion, received from the International Searching Authority, dated Feb. 17, 2017, for International Application No. PCT/EP2016/002080, pp. 1-14.
International Preliminary Report on Patentability, received from the International Bureau of WIPO, dated Jun. 19, 2018, for International Application No. PCT/EP2016/002080, pp. 1-10.

* cited by examiner

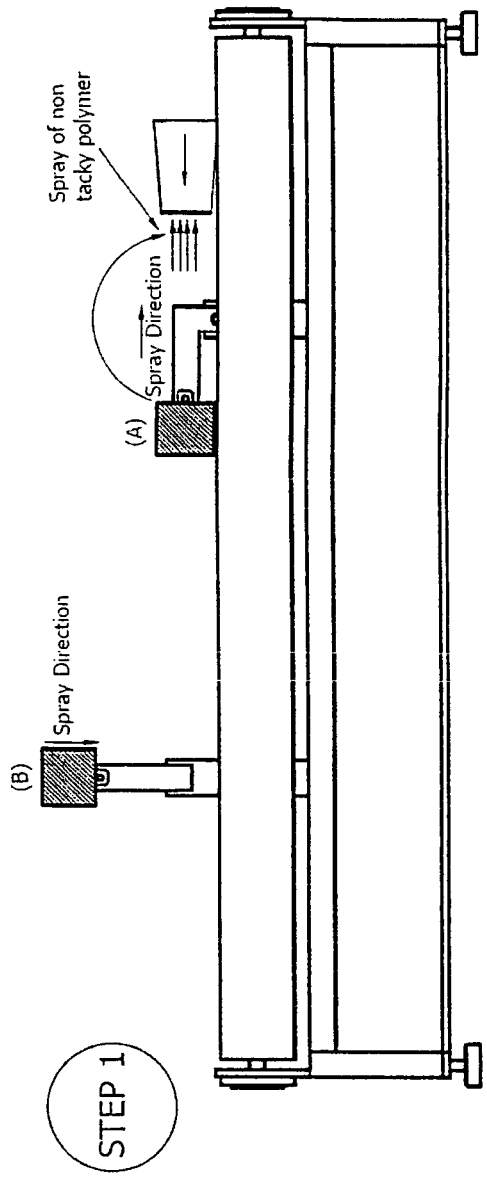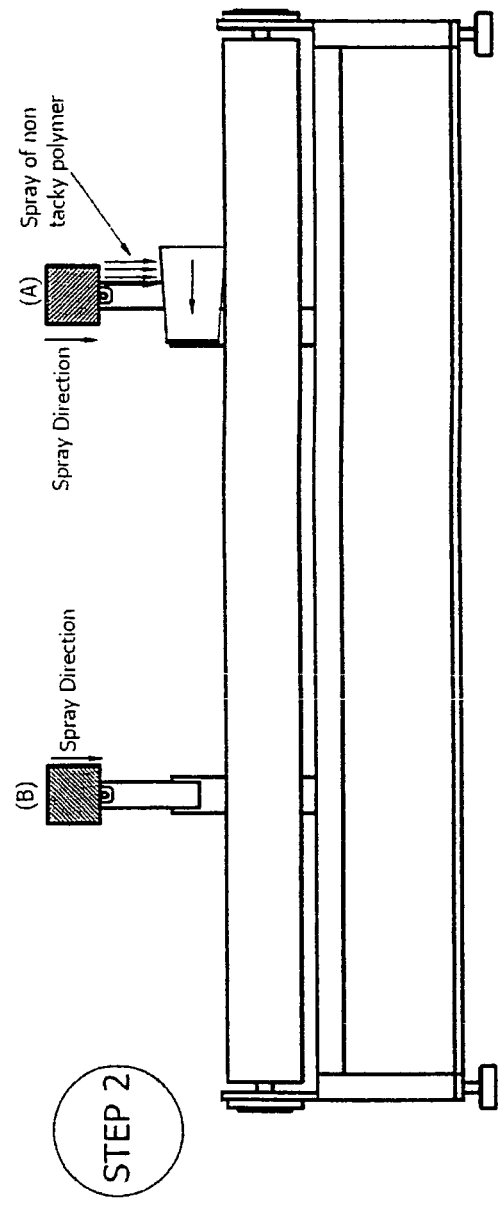
Fig. 10A
Fig. 10B

PROCESS FOR PRODUCING TACK-FREE HOTMELT MATERIAL AND DEVICE FOR PRODUCING THE SAME

CROSS-REFERENCE

This application is a section 371 U.S. National phase of PCT/EP2016/002080, filed Dec. 9, 2016 which claims priority from EP application no. 15003567.3, filed Dec. 15, 2015, which is incorporated by reference in its entirety.

FIELD OF INVENTION

The present invention relates to a process for producing a hot melt adhesive (HMA) material, preferably hot melt pressure sensitive adhesive (HMPSA) material, having a substantially tack-free coating comprising a novel moulding and spraying step, wherein said HMA material, preferably HMPSA material, can be easily handled, packed and transported for further use. In addition, the present invention relates to a corresponding device for producing a hot melt adhesive (HMA) material, preferably hot melt pressure sensitive adhesive (HMPSA) material, having a substantially tack-free coating.

BACKGROUND OF THE INVENTION

Hot melt adhesives (HMAs) are thermoplastic solid materials at room temperature and generally applied in molten or liquid state. Hot melt pressure sensitive adhesives (HMPSAs) are the class of HMAs which remain permanently tacky after solidification and have the ability to adhere on surfaces upon application of pressure.

HMAs are packed in different forms in respect to the characteristics of the product and end user requirements. HMA and specifically HMPSA present a variety of handling difficulties and contamination risks due to the tacky nature of the products unless protected with a tack-free (i.e. "non-tacky") film or coating. Moreover, high tack HMPSA formulations which are required in certain applications easily deform and cold flow unless supported during shipment or when stored for prolonged times at elevated temperatures. As a consequence, tack-free HMPSA packaging techniques are developed and tried to be improved in various ways. Basically, five different ways for forming HMA and specifically HMPSA polymers into individual blocks to be handled are known—casting in open moulds, pouring in containers with release liners, so-called flowpack systems, co-extrusion and granulation.

Many examples in the state of the art mention casting HMA and specifically HMPSA in molten state inside silicone coated containers such as carton boxes, drums, plastics, papers or disposable trays in different sizes. The material is subsequently cooled at ambient conditions or in large refrigerators during a suitable period of time, stacked, packed and prepared for dispatch. However, there are major disadvantages related to the casting methods commonly used to prepare HMA and HMPSA: there is a need to wait for a long period of time until the hot polymer material is cooled and solidified before being able to be removed from the containers; additional containers are required for cooling process; hazard potential is high as hot liquid is handled; the costs of disposable containers for the manufacturer are high; the packaging needs to be separated with a significant physical force by the user before adding the material in the melt pot and the packaging is disposed at the end of the processing creating waste and environmental problems; and most importantly, said methods cannot be carried out in terms of an in-line continuous process.

U.S. Pat. No. 5,373,682 describes a process wherein a molten HMPSA is directly poured or pumped into a cylindrical plastic tube of a plastic film which is in contact with a heat sink to remove excess heat from the film. The molten adhesive is fused to the surrounding film and a non-blocking adhesive package is provided, which at the end use melts simultaneously with the adhesive and does not cause significant build-up of packaging in the melt pot. In U.S. Pat. No. 5,865,927 a HMPSA with tack-free surface is described, wherein the adhesive is extruded through a die orifice; the surface of the adhesive is sprayed with a molten film forming polymeric material, while the adhesive is still in molten state. The surface of the coated adhesive is subsequently heat treated in order to provide a continuous film and the adhesive mass is cooled to a temperature suitable for handling.

In addition to casting, pouring molten HMA in mould cavities or plastic tubes and coextrusion of adhesive together with a non-tacky coating, there are also examples available in the prior art for pelletizing or squeeze-cutting (pillows) of HMPSA and powdering with non-tacky components such as organic (polymeric) material (e.g. phenolic resins)-containing powders, individually coating pelletized materials with non-tacky materials or filling the adhesive into plastic packaging films. EP 0 469 564 A1 discloses a method wherein HMA is firstly formed as uniform separate portions, solidified and finally enveloped in larger portions by a plastic packaging film. The plastic packaging material is a component of the adhesive or chemically compatible with the adhesive. Hence the packaging can be melted with the adhesive in the pot. However, both the adhesive and the film come into contact in cold state and there is no fuse or substantial interactions between the film and the adhesive. Hence, during the melting period, adhesive and film melt separately and due to the air pockets between the film and the portions of the HMA, the film is pushed and gathered on the top of the melt pot. Consequently, the film cannot be melted properly and floats on the surface of the tank, so-called "jelly fish effect" in the prior art, and the film subsequently carbonizes and blocks the filters in the melt pot. Carbonization can also be seen in the pillows method, included in flowpack systems. Moreover, commonly seepage of the HMA through the plastic film at the end sections can be observed in the chub method—also included in flowpack systems—according to which specially silicone coated boxes are required. Apart therefrom, such methods have problems of oxidation and charring of the HMA.

EP 0 410 914 A1 discloses a method for the preparation of non-tacky, free flowing polymeric particles by extruding the molten plastic material into a cooling fluid bath containing non-sticky material that is compatible with the plastic material, cutting the plastic material into portions, separating the portions from the cooling fluid and subsequently contacting individual particles with a second non-sticky material, preferably with powdered polyolefin waxes. U.S. Pat. No. 6,716,527 discloses a free flowing HMPSA in form of granulates, wherein an outer layer of the material is not pressure sensitive up to 45° C. HMPSA in molten form is granulated underwater, dried and individually sprayed with a fine droplet liquid coating component comprised of polyethylene wax, defoamer, film former and water, wherein individual pellets are covered by at least 90% by the coating component. Powdering or individual coating of the HMPSA granulates or pieces have major drawbacks, since the surface to volume ratio of the coating is significantly high and a high risk exists that the product is diluted and highly contaminated with the coating material.

Different than these methods, a process comprising moulding in pelletized, flaked or granulated form of the HMA material and spraying the non-tacky coating material on to the moulded tacky HMA material has been found to be the most advantageous method for easy handling, packing and transporting for further use of HMA materials. However, in the application of these techniques several problems have been encountered due to the permanently tacky nature of these materials. The most important of said problems is the separation of the moulded block of tacky HMPSA material from the mould itself. This is a common problem encountered in applications comprising moulding of tacky materials. There are several examples in the state of the art mentioning the application of a lubricating substance to the internal surface of a mould in order to use these for moulding tacky materials without the moulded materials sticking to the surface of the moulds. So moulded blocks can easily be separated from the mould itself.

In U.S. Pat. No. 1,666,730, one of the earliest disclosures mentioning the use of a lubricating substance for coating the surface of a mould, the tacky material, which is poured into the mould, is asphalt. According to this disclosure, the method of preparing asphalt for shipment consists of coating the walls of a mould with a lubricating substance, pouring into the mould melted asphalt, allowing the block to solidify, removing the moulded asphalt block from the mould, and inserting the moulded block in a fibre container of such size as will snugly retain the block. The problem in this case is that the mould is separated into pieces in order to take out the moulded asphalt and the surface of the mould pieces should be painted each time with the lubricating substance. A similar approach is disclosed in U.S. Pat. No. 3,165,567, wherein finely powdered materials are used as dry lubricants for surface impregnation of plastic and elastomeric materials in a step of moulding or casting operation in order to reduce the coefficient of friction of the surfaces of such materials. The dry lubricants are not applied directly onto the surface of materials which are desired to have less coefficient of friction. Instead an indirect method is adopted such as impregnating during moulding.

U.S. Pat. No. 5,112,552 discloses a process in which a nonautoadhesive substance is firstly sprayed onto the lateral walls and the bottom of a mould. Then, the mould is filled by pouring molten autoadhesive which is to be shaped and coated with a nonautoadhesive thermofusible substance. Finally, the spraying is repeated in order to protect the free upper surface. This is another example of coating while casting. The shaping of molten autoadhesive substance is done together with coating the surface with a nonautoadhesive substance. These cases require that the surface of the mould be coated each time with the nonautoadhesive substance.

EP 0 521 661 A1 and U.S. Pat. No. 5,292,468 are two other examples of coating the surface of adhesive materials with a tack-free coating during moulding. EP 0 521 661 A1 discloses a method which comprises lining the mould surface of a mould with a liner formed from a film of thermoplastic material capable of associating with the melted hot melt adhesive material to form a tack-free coating, whereas in U.S. Pat. No. 5,292,468 the casting of hot melt pressure sensitive adhesive is made into a mould that has previously been coated with a protective web. The coatings in these disclosures are not permeable, which do not allow the moisture of the moulded HMA material to leave the packed HMA material.

U.S. Pat. Nos. 4,748,796 and 4,755,245 disclose a method of conditioning a permanent adhesive composition in a casting mould which is previously coated electrostatically with a powder screen and casting material is poured into the mould without disturbing the powder by holding the powder in position with static electricity. The result of this method is not satisfactory, since the upper surface cannot be protected by the same method. EP 0 347 741 A2 discloses a method in which a molten adhesive is cast in one or more flexible moulds made of a sufficiently temperature-resistant elastomer having sufficient non-stick properties, so that the cast adhesive body after being cooled can be easily removed. The shape of the obtained adhesive bodies is described to be spherical or ellipsoid or a segment thereof so as to reduce the agglomeration capacity in order to prevent them from sticking to each other.

Another method for packaging self-adherent thermosetting adhesive compositions which comprises a mould with a permanent anti-adhesive coating is disclosed in EP 0 749 820 A1. According to this method, the molten composition is poured into the mould with a non-stick lining, then the mould is cooled down to 50° C. and said composition is removed. Finally, the demoulded block is treated in order to make the surface non-self-adhesive. Although there is a non-stick lining, several methods are proposed in order to remove the self-adherent block from the mould such as blowing air between the block and the walls of the mould, by extraction with forceps or by using vacuum, all of which are either unsatisfactory or time/money consuming. Additionally, blowing air can only be a solution when the moulded material is a solid block of tacky material.

Apart from individual problems, all these moulding techniques have the common problem of being a non-continuous process. The molten adhesive material is received hot and waits in the mould or container until it gets cold and solidifies. Additional time or space is required compared with a continuous process. In the case of pouring in containers, in which the walls are applied or sprayed with lubricants, there is the risk that these lubricants used as release agents adversely affect the adhesive properties of the moulded materials, especially in case of HMPSA polymers. Also, since the adhesive material is received as hot in molten form, these moulding techniques carry the risk of burning accidents which make these techniques disadvantageous also from the health and safety perspective.

SUMMARY OF THE INVENTION

In view of the above, the technical problem underlying the present invention is to provide an efficient technique for packaging HMA material, preferably HMPSA material, having a substantially tack-free coating in order to improve the handling of tacky materials as well as to eliminate the use of packaging films for HMAs, which cause carbonization and clogging problems in the HMA-melt pots. Further, the technique should provide a flexibility for choosing the type of coating materials in terms of compatibility with HMA, preferably HMPSA, and melting behaviour, which directly affects the product performance and end use properties of HMA, preferably HMPSA.

The solution to the above technical problem is achieved by providing the embodiments characterized in the claims.

DESCRIPTION OF THE DRAWINGS

The present invention will be described in more detail herein-below with respect to the following embodiments along with the accompanying drawings, wherein

FIGS. 10A to 10D illustrate four steps of a preferred spraying process of the present invention.

Figure 1:
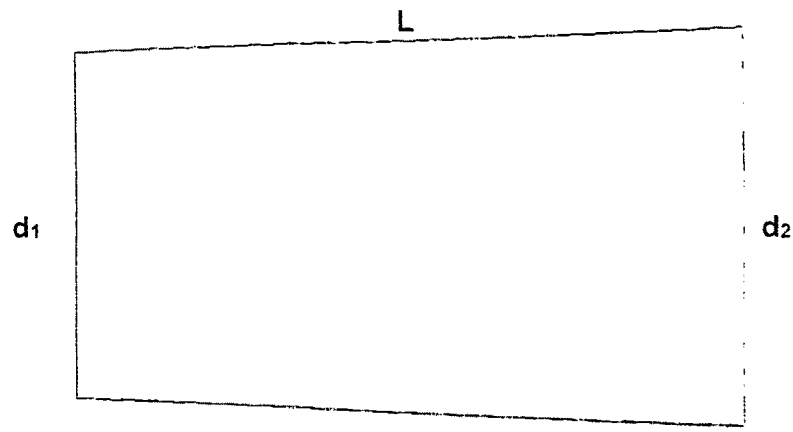
FIG. 1 illustrates the truncated cone shape of the HMA material according to the present invention.

LIST OF REFERENCE SIGNS 1 moulding means
2 mould
3 movable disc (bottom lid)
4 movable extractor disc
5 reciprocating frame
6 filling station
10 spraying means
11 first pair of rotating rollers
12 second pair of rotating rollers
13 roller conveyor

DETAILED DESCRIPTION OF THE INVENTION

In particular, the present invention provides a process for producing a HMA material having a coating, wherein said coating has a tack-free property up to 50° C., said process comprising a moulding step of moulding cold HMA granules into a block of agglomerated HMA granules, wherein said moulded block has a truncated cone shape, and a subsequent spraying step of applying a coating material present in liquid or molten form at least partially to the top, bottom and lateral surfaces of said truncated cone-shaped block of agglomerated HMA granules present in solid form.

According to the present invention, the term "HMA material" includes preferably the class of HMPSAs; i.e. in a preferred embodiment the term "HMA material" as used herein can be replaced by the term "HMPSA material". The same applies to terms like "HMA granules", "HMA block(s)" and "HMA mass" used herein-below. Moreover, the terms "tack-free" and "tack-free property" up to a certain temperature (T) have to be understood in the common technical sense in the technical field of HMA materials and mean that the material will not stick to the surfaces which it will typically come in contact with (packaging, operators hands etc.) below the referred temperature (T). Generally, said property can be evaluated by placing the material inside a carton box, where the blocks of HMA having the coating are in touch with each other. The box is closed and put in an oven at the referred temperature during one week. Then, the box is taken out of the oven and let equilibrate at room temperature. Then, if every block of coated HMA can be taken easily out individually by hand without sticking to the neighbouring block, protective paper or the operator's hand, the coating is evaluated as tack-free.

According to the present invention, cold HMA granules are moulded into a block of agglomerated HMA granules. The term "granules" has to be understood in its broadest sense as solid particles or grains without limitation as to the shape, including flakes and pellets.

According to a preferred embodiment, the HMA granules are compressed under mechanical pressure into the block of agglomerated HMA granules. Upon compression of the HMA granules in the moulding step, the sticky HMA granules agglomerate so as to form the block of agglomerated HMA granules, wherein said moulded block has a truncated cone shape which will be maintained after coating and cold flow, flaking and bleeding effects can be substantially prevented, which may naturally occur during storage or transportation under high heat and pressure conditions.

According to the present invention, cold HMA granules are moulded in the moulding step, which means that the granules or the mould in which said granules are to be placed are not heated. Preferably, the surface temperature of the HMA granules in the moulding step is 0° C. to 30° C., more preferably 8° C. to 20° C.

According to a preferred embodiment of the present application, in the step of applying the coating material, the surface temperature of the block of agglomerated HMA granules is in the range of from −20° C. to 40° C., even more preferably 0° C. to 30° C., most preferably 10° C. to 15° C. That means, before entering the coating zone, the HMA granules may optionally be cooled to such extent that the surface temperature is 40° C. or less.

In the subsequent spraying step, a coating material, which is present in liquid or molten form, is applied at least partially to the top, bottom and lateral surfaces of the truncated cone-shaped block of agglomerated HMA granules, which is present in solid form. Preferably, the entire surface of the block of agglomerated HMA granules is coated with the coating material. According to the present invention, coating the entire surface of the block of agglomerated HMA granules means that the whole circumference of the HMA block is covered with the coating material, so that the whole HMA block is covered, preferably in terms of a fine web or mesh of the coating material. Thus, according to the present invention, it is preferred that the coating is permeable.

According to a preferred embodiment, the surface of the block of agglomerated HMA granules is continuously coated with the coating material while being rotated. This rotation of the block of agglomerated HMA granules is advantageous so that the whole circumference of the HMA block can be covered with the coating material.

According to another preferred embodiment, in the step of applying the coating material, the block of agglomerated HMA granules is moved in the longitudinal direction upon rotation of a pair of rotating rollers providing a continuous coating while being in forward motion on the rollers. In such a case, the pair of rotating rollers can also be regarded as roller conveyor.

According to a further preferred embodiment, the coating material is continuously or intermittently applied using at least one swivelling spraying head, comprising two steps of horizontally spraying the coating material onto the surface of a top and bottom base (first and second base) of the truncated cone-shaped block of agglomerated HMA granules, while the at least one spraying head is in horizontal positions, and upon rotation of the at least one spraying head to a vertical position, a step of vertically spraying the coating material onto the lateral area of the truncated cone-shaped block of agglomerated HMA granules while the block is being rotated.

According to a further preferred embodiment, the coating material is continuously or intermittently applied using two swivelling spraying heads, wherein the coating material is first vertically sprayed onto the lateral area of the truncated cone-shaped block of agglomerated HMA granules by a first spraying head in a vertical position while the block is being rotated, upon rotation of the first spraying head to a horizontal position, horizontally sprayed onto the surface of a second base (bottom base) of the truncated cone-shaped block of agglomerated HMA granules, horizontally sprayed onto the surface of a first base (top base) of the truncated cone-shaped block of agglomerated HMA granules by a second spraying head in a horizontal position, and upon rotation of the second spraying head to a vertical position, vertically sprayed onto the lateral area of the truncated cone-shaped block of agglomerated HMA granules.

The final product of the coated truncated cone-shaped block of HMA material is present in substantially tack-free form up to 50° C. and the coating has the ability to melt simultaneously with the HMA mass in a melt tank in further applications. Further, according to the present invention, the tack-free coating is permanent allowing the coated block of agglomerated HMA granules to melt significantly faster than blocks produced with other systems.

The present invention further provides a device for producing said coated truncated cone-shaped block of HMA material. Said device comprises moulding means for moulding HMA granules into a truncated cone-shaped block of agglomerated HMA granules, and spraying means for applying a coating material present in liquid or molten form at least partially to the surface of said truncated cone-shaped block of agglomerated HMA granules present in solid form.

According to a preferred embodiment, the moulding means comprises a mould having an open top and open bottom, a movable disc forming a bottom lid and a movable compressor/extractor disc for compressing the HMA granules from the top of the mould in a state in which the disc—forming a bottom lid—closes the bottom of the mould while it is being filled and for removing the block of agglomerated HMA granules present in solid form through the bottom of the mould via the pressure of the compressor/extractor disc, wherein the inner diameter of the bottom of the mould is larger than the inner diameter of the top of the mould.

Preferably, the movable disc forming a bottom lid has a circular recess on the surface facing the mould having a rounded edge, wherein the diameter of said recess corresponds to the inner diameter of the bottom of the mould. As will be described in more detail below, the movable disc functions as a bottom plate closing the mould as well as an elevator transporting the moulded HMA block onto a conveyor delivering said HMA block to the spraying means.

According to another preferred embodiment, the rounded edge of the circular recess has a curvature radius (r) which is equal to the average radius of the HMA granules.

According to another preferred embodiment, the spraying means comprises at least two spraying units adapted to provide the coating material onto the surface of the block of agglomerated HMA granules while being rotated, wherein the spraying units comprise vertically and horizontally spraying nozzles.

The spraying means preferably comprises at least one pair of rotating rollers for rotating the block of agglomerated HMA granules located on said rollers. The direction of rotation of each of said rollers is equal so that the HMA block is able to rotate around its longitudinal axis between the rollers. The rollers may be conical, to match the conical gradient of the truncated cone-shaped HMA block and thus prevent it from moving along its longitudinal axis.

According to another preferred embodiment of the present invention, instead of spraying on rotating rollers which rotate the longitudinally stationary HMA block, at least one pair of rollers is adapted to rotate the block of agglomerated HMA granules while moving the block of agglomerated HMA granules through the spraying units. In said embodiment, two rollers having their axis parallel to each other with adjustable interspace in between and diameters different or equal to each other and rotation speeds equal or different from one another and surface slip coefficients different or equal to each other are used to rotate the truncated cone-shaped HMA block around its longitudinal axis. At the same time, due to the special shape of the HMA block, said block is forced to move forward (i.e. towards and through the spraying units) while rotating on said rollers, because of vectorial forces caused by its conical shape and diameter differential.

According to another preferred embodiment, the device further comprises pusher fingers provided on a chain conveyor to push forward the block of agglomerated HMA granules rotating on the pair of rollers (roller conveyors), particularly in order to push forward the block of agglomerated HMA granules at a higher speed than the speed at which they would move by themselves if not forced by the pushers.

According to a preferred embodiment, the spraying units comprise at least one spraying unit including a swivelling spraying head which is rotatable by at least 90° between horizontal and vertical positions, in which the coating material is horizontally sprayed in a horizontal position of the at least one spraying head onto the surface of the bases of the truncated cone-shaped block of agglomerated HMA granules, and in which the coating material is vertically sprayed in a vertical position of the at least one spraying head onto the lateral area of the truncated cone-shaped block of agglomerated HMA granules. In particular, the spraying units may comprise a first spraying unit including a swivelling spraying head which is rotatable by 180° between horizontal positions, in which the coating material is horizontally sprayed onto the surface of the bases of the truncated cone-shaped block of agglomerated HMA granules, and a vertical position in which the coating material is vertically sprayed onto the lateral area of the truncated cone-shaped block of agglomerated HMA granules. Preferably, the spraying units further comprise a fixed vertical spraying head mounted after the first spraying unit. Here, the HMA block which has been sprayed all over and is still in forward motion reaches the fixed vertical spraying head, where it may (or may not) be sprayed again, just from the top, to apply a second coating layer onto the lateral surface of the HMA block, if necessary.

According to another preferred embodiment, the spraying units comprise a first spraying unit including a swivelling spraying head which is rotatable by at least 90° between horizontal and vertical positions, and a second spraying unit including a swivelling spraying head which is rotatable by at least 90° between horizontal and vertical positions, wherein the coating material is horizontally sprayed in a horizontal position of the spraying heads onto the surface of the bases of the truncated cone-shaped block of agglomerated HMA granules, and wherein the coating material is vertically sprayed in a vertical position of the spraying heads onto the lateral area of the truncated cone-shaped block of agglomerated HMA granules. More preferably, the spraying units comprise two spraying units each including a swivelling spraying head which are both rotatable by 90° between horizontal and vertical positions, in which the coating material is first sprayed onto the lateral area of the truncated cone-shaped block of agglomerated HMA granules while the block is passing through the first spraying unit. Then, the swivelling spraying head of the first spraying unit rotates 90° to its horizontal position in order to spray the rear end after the block passes through it. The second spraying unit in its horizontal position sprays the front end of the block as it approaches in forward motion and then takes its vertical position by rotating 90° to spray onto the lateral surface of the HMA block in order to apply a second coating layer.

According to the present invention, it is possible to provide an efficient process, preferably a continuous process, for producing a HMA material having a substantially tack-free coating, in which each of the process steps can be carried out in-line without resulting with the problems of carbonization, films clogging filters, adhesive seepage or non-recyclable silicone coated containers, contrary to methods known in the art. Since cold HMA granules are moulded into a block of agglomerated HMA granules, it is not necessary to wait for a long period of time until the HMA blocks can be further processed. In particular, the cycle time in the moulding step is very short, such as 3 to 6 seconds. Further, the environmental impact can be minimized, since the production of waste can be minimized. The solution therefore resides in the special design of the moulded HMA block, since the truncated cone shape surprisingly allows that the moulded HMA block can be easily removed from the mould while maintaining its shape.

Due to the specific spraying step, no film wrapping is necessary, and thus problematic carbonization and/or clogging of filters will not be caused. Further, the specific spraying step provides the final product having the coating without and further subsequent cooling, which is preferably permeable, so that the coated HMA material can be handled immediately. Since the coating is permeable, it is possible that any traces of humidity can escape from the HMA block.

The final product of the coated truncated cone-shaped block of HMA material is present in substantially tack-free form and the coating has the ability to melt simultaneously with the HMA mass in a melt tank in further applications. Further, according to the present invention, the tack-free coating is permanent allowing together with its agglomerated form with interspace between the HMA granules that the coated HMA blocks melt significantly faster than blocks produced with other systems.

According to the present invention, cold HMA granules are moulded into a block of agglomerated HMA granules having a specific shape, and thereafter, i.e. after being removed from the mould, the surface of said truncated cone-shaped block of agglomerated HMA granules is coated with a coating material so as to impart a tack-free property up to 50° C.

The process according to the present invention preferably comprises, prior to the moulding step a step of pelletizing, flaking or granulating the HMA mass (i.e. the raw material for the HMA granules).

The raw material for the HMA granules does not underlay any limitation and may comprise one or more constituents selected from the group consisting of polyesters, poly(meth) acrylates, polyolefins, polyurethanes, ethylene-based copolymers, polyvinyl acetate and copolymers thereof, copolymers of vinyl monomers and polyalkylene oxides, styrene block copolymers, and blends or mixtures thereof. Further, the HMA mass may contain as optional constituents/components one or more selected from the group consisting of tackifying resins, plasticizers, waxes, antioxidants, stabilizers, adhesion promoters, fillers, pigments, dyes, oils, and fragrances.

The HMA granules may be obtained by conventional methods, such as underwater pelletizing systems and extruder systems. The shape and size of the HMA granules are not specifically limited and may be cylindrical, rectangular or spherical, preferably from 1 to 30 mm, more preferably 3 to 10 mm, wherein a spherical shape is preferred. Before applying the HMA granules into the moulding step, the HMA granules should be solidified in a cooling fluid, preferably in water, and substantially dried at the end of the process as well known in the prior art, all in a continuous process. The cooling fluid may preferably consist of anti-blocking surface finishing materials, release agents or pelletizing aids as e.g. described in U.S. Pat. Nos. 4,645,537, 4,576,835 and 4,774,138, in order to keep the individual granulates from sticking to each other during the cooling process.

The HMA granules which are in cold state, preferably from 0° C. to 30° C., more preferably from 8 to 20° C., and temporarily in relatively low tack form owing to the low temperature, are filled into a mould cavity which can be constructed in different sizes, preferably to obtain from 100 g to 5.000 g, more preferably 200 g to 2.000 g, of the HMA granules. The HMA granules are moulded in the moulding step so as to agglomerate the same into a truncated cone-shaped block. The truncated cone shape of the HMA blocks is illustrated in FIG. 1. According to the present invention, the size of the truncated cone-shaped HMA blocks can be selected with respect to the characteristics of the product and end user requirements as long as one of the diameters of the bases is smaller than the other. Referring to FIG. 1, the diameter $d_1$ of one base is smaller than the diameter $d_2$ of the other base. Depending on the length L, $d_1$ and $d_2$ may be arbitrarily selected as long as the shape is not cylindrical. Preferably, $d_1$ is at least 1% to 30% smaller than $d_2$. For example, the HMA blocks may have a length L of 5 cm to 50 cm, preferably 7 cm to 30 cm, and a first diameter $d_1$ of 2 cm to 30 cm, preferably 5 cm to 25 cm. The angle of the lateral surface from vertical axis when standing upright is between 0.9 to 7 degrees and preferably between 1 and 2.5 degrees.

Figure 2:
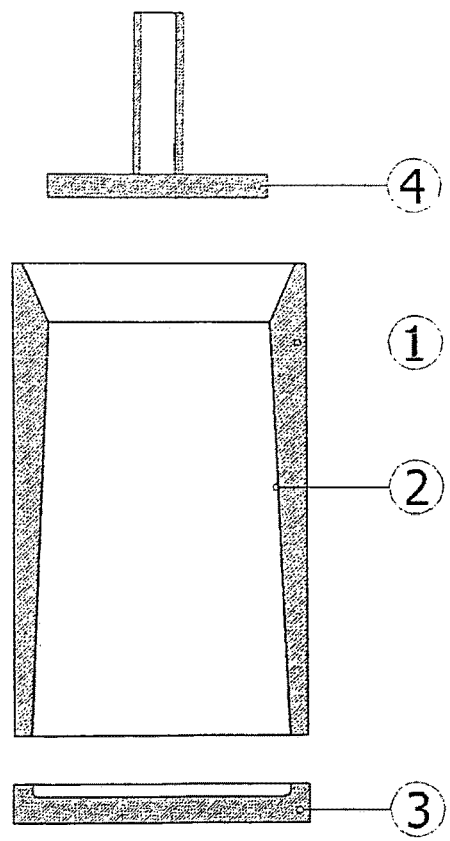
FIG. 2 shows moulding means (1) for moulding HMA granules according to the present invention comprising a mould (2) having an open top and open bottom, a movable disc (3) forming a bottom lid and a movable compressor/extractor disc (4)

The shape of the HMA block is specified by the design of the mould. A preferred embodiment of the moulding means (1) is shown in FIG. 2. As shown in FIG. 2, a vertically standing mould (2) of a special form with an open top and bottom is preferably used. The mould cavity has a corresponding conical shape and may be coated with a permanent anti-stick coating or can be made of any anti-stick elastomeric component, like silicone, polytetrafluoroethylene, ceramic and other anti-stick coatings known in the art and combinations thereof. The moulding means (1) further comprises a disc (3) to form the bottom lid of the mould (2) which can be moved down to open the bottom of the mould or moved up to close it. The moulding means (1) further comprises a compressor/extractor disc (4) which is smaller than the top opening of the mould (2), so that it passes through the opening and can move vertically downward to compress the HMA granules. Due to the specific shape of the mould cavity and correspondingly of the HMA blocks, it is possible to easily remove/extract the truncated cone-shaped HMA blocks from the mould (2).

Preferably, the mould cavity may have additional units for spraying various liquids like fine mist of cold water, mineral oil, etc., to the inner walls of the mould cavity, in order to increase the anti-stick property of the inner surface of the mould (2).

Figure 4:
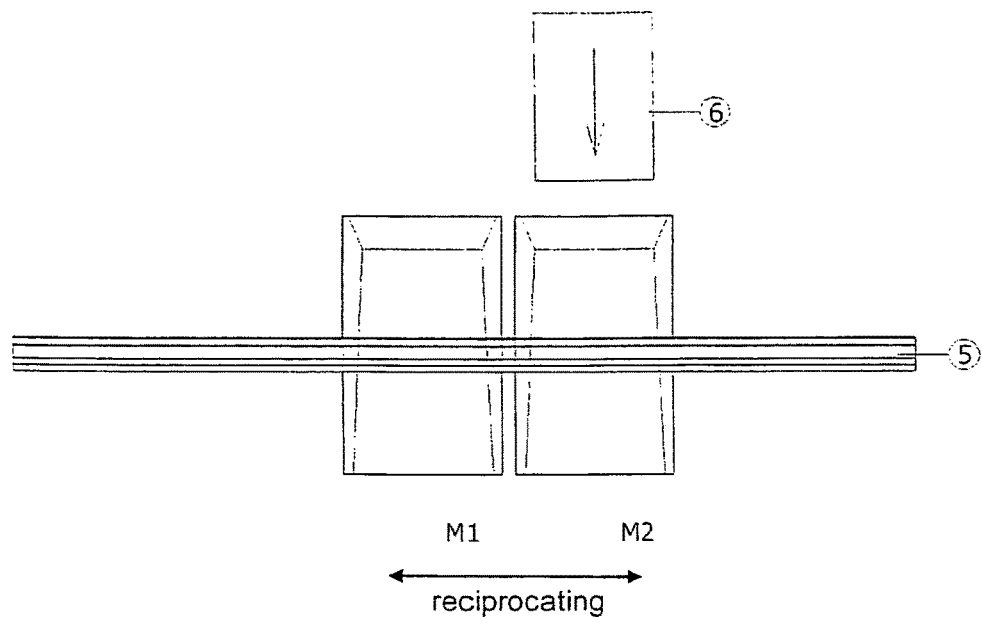
FIG. 4 shows moulding means according to one embodiment of the present invention in which two reciprocating moulds (M1 and M2) are alternately filled with HMA granules and compressed.

In another embodiment, there might be more than one mould (2), wherein the moulds are capable to work simultaneously, e.g. while one mould is filled, pressure for agglomeration of the granules is applied in the secondary mould, for improving the speed of the filling process. In particular, two moulds (M1 and M2) as shown in FIG. 4 may be mounted on a reciprocating frame (5), which sequentially brings the moulds (M1 and M2) under the filling pipe of the filling station (6). One mould is being filled while the HMA granules already inside the other mould are being compressed and then ejected from the bottom of the mould (2).

The process can exemplary be carried out as follows. The mould M2 is being filled with the HMA granules under the filling station (6) while the HMA granules already filled into mould M1 are compressed by the downward motion of the compressor/extractor disc (4) for a predetermined time and under predetermined mechanical pressure in order to agglomerate said granules. Then, the compressor/extractor disc (4) moves back up to its parking position. Thereafter, the bottom lid (3) of mould M1 opens while the compressor/extractor disc (4) moves again downwards to push and discharge the block of agglomerated HMA granules resting on the bottom lid (3) out of the mould M1. The bottom lid (3) thereby functions at the same time as an elevator to lower the block of agglomerated HMA granules onto a conveyor that takes the block of agglomerated HMA granules to the spraying means (10) of the spraying step. For example, upon reaching the bottom of its stroke at the level of the conveyor, the bottom lid (3) rotates by 90° along its axis to gently transfer the block of agglomerated HMA granules onto the conveyor in a way to have the longitudinal axis of the block centred on the longitudinal axis of the conveyor. Afterwards, the compressor/extractor disc (4) retracts to its uppermost position, the bottom lid (3) moves back up and closes, and the reciprocating frame (5) changes its position. Mould M1 is taken back under the filling station (6), and mould M2 undergoes the same steps as those for mould M1 described above, whereby the cycle is repeated.

The compression force and duration to keep the HMA granules under pressure are adjustable. However, during the compression cycle of the HMA granules in the mould (2), the time span during which it is kept under compression is critical. If the HMA granules are compressed for too long, the moulded HMA block will adhere excessively to the inner surface of the mould (2). Thus, detachment of the HMA block would be impeded. If the compression time is too short, the HMA granules do not agglomerate properly and the shape of the moulded HMA block might not be maintained upon discharge. Thus, the compression step is precisely adjusted with a precision of milliseconds as will be appreciated by a person skilled in the art. For example, the pressure applied by the compressor/extractor disc (4) may be 3 to 6 bar for 100 milliseconds to 2 seconds. Said values, of course, depend on the raw material for the HMA granules and may be fine-tuned according to the tackiness of different product formulations.

Figure 3:
FIG. 3 shows the movable disc (3) in an enlarged manner.

According to a preferred embodiment, the bottom lid (movable disc) (3) has a circular recess on the surface facing the mould (2), wherein the diameter of said recess corresponds to the inner diameter of the bottom of the mould (2). Said recess of the bottom lid (3) is shown in FIG. 3. As can be taken from FIG. 3, the recess has a rounded edge having a specific curvature radius (r). Preferably, the curvature radius (r) is adjusted to the HMA granules to this extent that the curvature radius (r) is equal to the average radius of the HMA granules. Otherwise, the granules along the bottom edge of the agglomerated block may break away from the agglomerate during transfer from the mould to the conveyor. In this regard, the average radius of the HMA granules refers to the average grain size determined in terms of equivalent diameter of the granules. Commonly, the average radius of the HMA granules may range from 4 to 8 mm, without being limited to said size, determined by sieve analysis.

The agglomerated ("stand alone") HMA block which is extracted from the mould (2) by the above-described special mechanical operation is then transferred to the spraying step in which the tack-free coating is applied to the surface of the HMA blocks. The block may be conveyed from the moulding section to the spraying means (coating zone) (10) by special non-adherent conveyors.

Before entering the coating zone, the HMA blocks may optionally be conveyed through a heated (convection, infrared, microwave etc.) and low humidity zone in order to separate any remaining cooling fluid or condensed air. The heating zone is preferably below the softening point of the HMA, preferably below 80° C., so as not to soften the material. In such a case, the HMA blocks may optionally be cooled to such extent that the surface temperature is within the range of from −20° C. to 40° C., more preferably 0° C. to 30° C., and most preferably 10° C. to 15° C.

According to the present invention, after the moulding step, the obtained block of agglomerated HMA granules is automatically transferred to the spraying means (10), wherein the coating material is sprayed in a special pattern while the HMA block is rotated in order for the coating material to cover the whole surface.

The coating material is not specifically limited as long as a tack-free property up to 50° C. can be imparted to the block of agglomerated HMA granules. Preferably, the coating material has similar characteristics as the HMA so that the coating does, in principle, not impart any negative effect during a later melting process of the coated HMA material. During the application, the coating material interacts with the surface of the HMA blocks to a certain level and forms a united material, melts simultaneously and may form blends with the HMA material.

The coating material has preferably a temperature of from 80° C. to 250° C., more preferred 120° C. to 210° C., most preferred from 150° C. to 200° C., when applied to the surface of the HMA block. The coating material has preferably a DSC melting point or, in cases where melting point does not apply, a softening point (ASTM E 28) of more than 50° C.

The coating material may comprise one of more constituents selected from the group consisting of waxes or derivatives thereof, ethylene-based (co)polymers, polyolefins, polyvinyl acetate and copolymers thereof, poly(meth)acrylates, polyesters, polyvinyl alcohols, polyurethanes, copolymers of vinyl monomers and polyalkylene oxides, elastomeric block copolymers, and blends or mixtures thereof. Further, the coating material may contain as optional constituents/components one or more selected from the group consisting of plasticizers, stabilizers and antioxidants.

The coating material may be applied by any spraying method known in the art, such as e.g. spray coating or curtain coating. After applying the coating material to the surface of the HMA block, if necessary, the applied coating may be cooled down to room temperature (20° C. to 25° C.) to obtain the coated HMA material in a ready-to-use form.

Preferably, the surface of the block of agglomerated HMA granules is continuously coated with the coating material while being rotated. This rotation of the block of agglomerated HMA granules is advantageous so that the whole circumference of the HMA block can be covered with the coating material. The rotation of the block of agglomerated HMA granules can be performed by any means known in the art. Preferably, the block of agglomerated HMA granules is rotated in that said block is located on a pair of rotating rollers.

In such a case, the spraying means (10) preferably comprises at least one pair of rotating rollers for rotating the block of agglomerated HMA granules located on said rollers. Preferably, the surfaces of the rotating rollers are coated with a non-stick coating. The direction of rotation of each of said rollers is equal so that the HMA block is able to rotate around its longitudinal axis between the rollers which are arranged in parallel. The rollers are conical to match the conical gradient of the truncated cone-shaped HMA block so that the rollers rotate the longitudinally stationary HMA block.

The spraying means (10) preferably comprises at least two spraying units (A, B) adapted to provide the coating material onto the surface of the block of agglomerated HMA granules while being rotated, wherein the spraying units (A, B) comprise vertically and horizontally spraying nozzles.

A full width assembly of spraying nozzles may be employed which spray the coating material vertically onto the rotating HMA block along its full lateral area of the truncated cone-shaped HMA block while—either simultaneously or sequentially—a second set of nozzles located on both sides of the HMA block spray the coating material horizontally onto the HMA block's two base surfaces.

Figure 5:
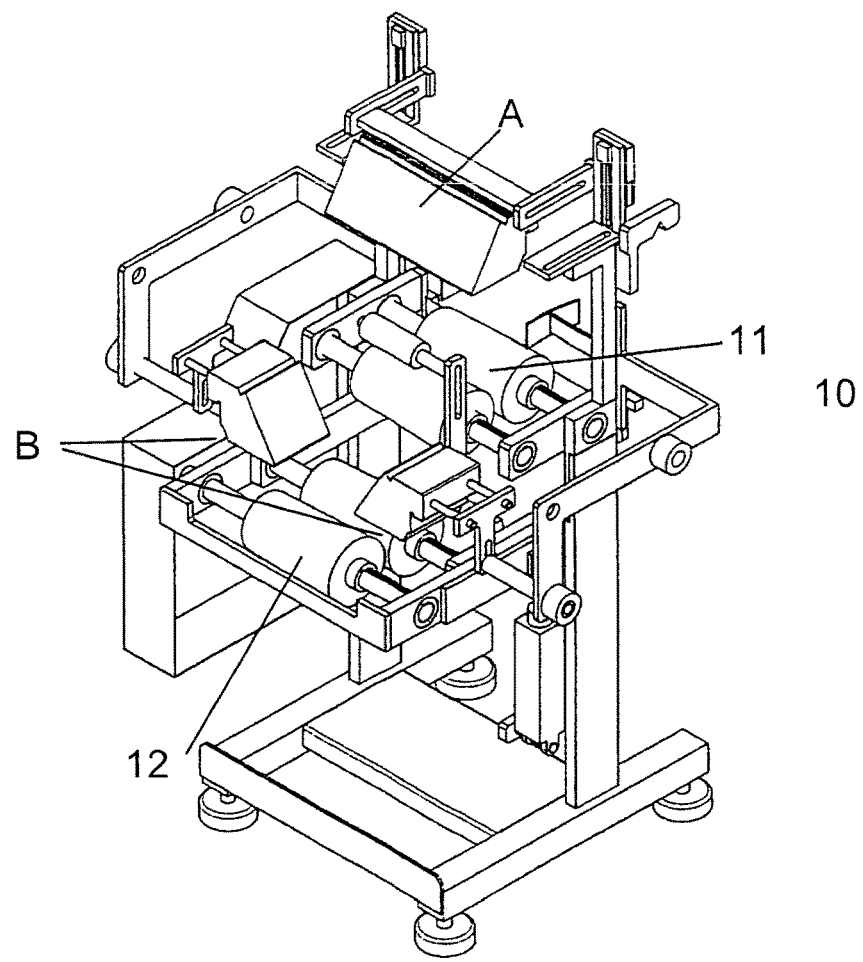
FIG. 5 shows spraying means (10) according to one embodiment of the present invention comprising two pairs of rotating rollers (11 and 12) and two sets of spraying units (A and B)
Figure 6:
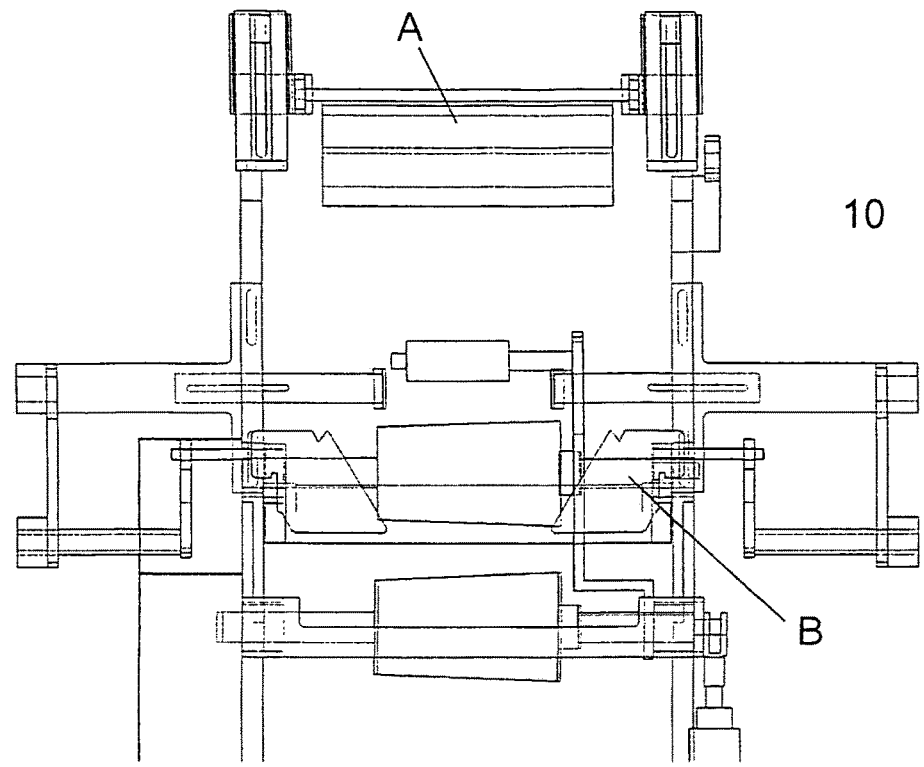
FIG. 6 is a front view of the spraying means (10) shown in FIG. 5.
Figure 7:
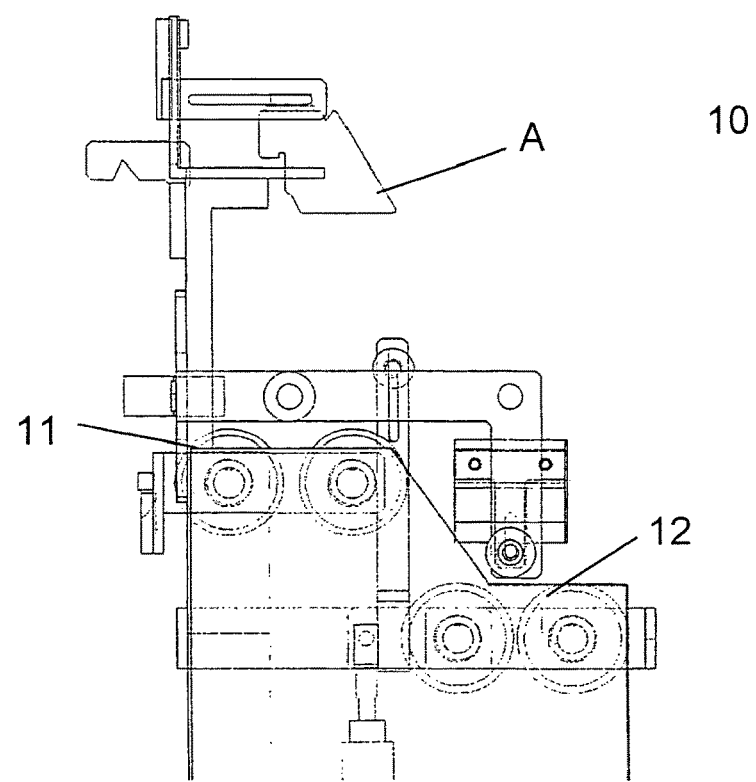
FIG. 7 is a side view of the spraying means (10) shown in FIG. 5.

According to the present invention, the coating material is preferably applied in at least two steps using vertically and horizontally spraying nozzles. As shown in FIGS. 5 to 7, for example, in a first step, the rotating HMA block may be coated with the coating material by vertically spraying nozzles of spraying unit (A) arranged above the rotated HMA block placed on the rollers (11), whereby the coating material is vertically sprayed onto the lateral area of the truncated cone-shaped HMA block (the HMA block is not shown in FIGS. 5 to 7). Next, the HMA block is transferred onto a second pair of rotating rollers (12), wherein horizontally spraying nozzles of spraying unit (B) are arranged on both sides. In such a second step, the rotating HMA block may be coated with the coating material by horizontally spraying nozzles of spraying unit (B) whereby the coating material is horizontally sprayed onto the surface of the bases of the truncated cone-shaped HMA block. The order of said spraying steps can be arbitrarily selected.

Vertical and horizontal positions and angle of the spraying nozzles are adjustable along the X, Y, Z axes. The spraying may start automatically as the HMA block enters the respective spraying unit. The duration of both the vertical and the horizontal spraying and their sequential starting times (if any) are defined in milliseconds. Further, the rotation speed of the rollers and the amount of spraying are synchronized to have predetermined coating amount of the coating material to enable "breathing" of the HMA block of agglomerated granules so that after coating is applied on the surface of the block, residual moisture may escape. As will be described in more detail herein-below, the spraying units (A, B) may also comprise at least one spraying unit including a swivelling spraying head which is rotatable by at least 90° between horizontal and vertical positions, in which the coating material is horizontally sprayed in a horizontal position of the at least one spraying head onto the surface of the bases of the truncated cone-shaped block of agglomerated HMA granules, and in which the coating material is vertically sprayed in a vertical position of the at least one spraying head onto the lateral area of the truncated cone-shaped block of agglomerated HMA granules. Upon exiting the spraying means (10), the blocks of HMA material have a totally tack-free outer surface and can be handled and packed like non-sticky materials.

Alternatively to the spraying means (10) shown in FIGS. 5 to 7, in which two pairs of rotating rollers (11 and 12) and two spraying units (A and B) are used, according to another preferred embodiment of the present invention, the spraying means (10) may comprise at least one pair of rollers (13) adapted to rotate the block of agglomerated HMA granules and, at the same time, to move the block of agglomerated HMA granules through the spraying units (A and B), i.e. the pair of long rollers (13) can be regarded as roller conveyor.

Figure 8:
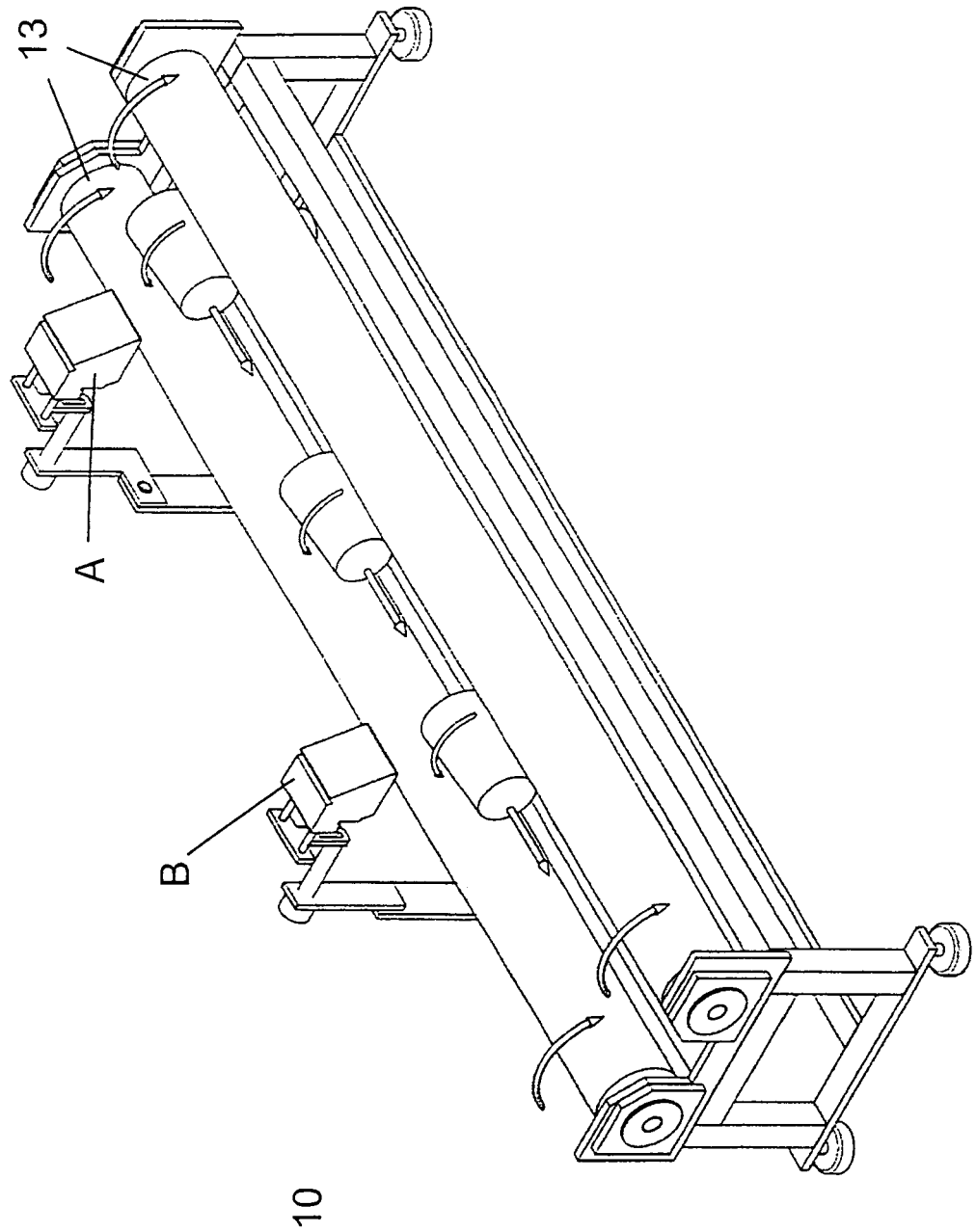
FIG. 8 shows spraying means (10) according to another embodiment of the present invention comprising one pair of a rotating roller conveyor (13)

Referring to FIG. 8, instead of using rotating rollers (11 and 12), which rotate the longitudinally stationary HMA block, at least one pair of long rollers (13) may be configured to rotate and, at the same time, move the block of agglomerated HMA granules through the spraying units (A and B). In said embodiment, two rollers having their axis parallel to each other with adjustable interspace in between and diameters different or equal to each other and rotation speeds equal or different from one another and surface slip coefficients different or equal to each other are used to rotate the truncated cone-shaped HMA block around its longitudinal axis. At the same time, due to the special shape of the HMA block, said block is forced to move forward (i.e. towards and through the spraying units) while rotating on said rollers, because of vectorial forces caused by its conical shape and diameter differential. The spraying units (A and B) are mounted along said longitudinal roller conveyor (13) and apply the spray coating to the HMA block while said HMA block moves forward passing under the spraying units (A and B) while being in rotation. Thereby, the entire surface of the HMA block can be coated with the coating material forming a tack-free mesh.

The rotational speed of the roller conveyor (13) and both the differential speed and interspace between the two rollers are adjustable and varied according to the speed of the forward movement of HMA block as required. The two rollers may have different surface friction coefficient values. The angle of attack of the spraying units (A and B), their height above the HMA block, the timing at which they start and stop spraying, the temperature and pressure of the melt sprayed can be precisely adjusted to have a precisely metered fine mesh which should not exceed in weight a percentage of the weight of the uncoated block.

Preferably, the device according to the present invention may further comprise pusher fingers provided on a chain conveyor to push forward the block of agglomerated HMA granules rotating on the roller conveyors (13), in order to push forward the block of agglomerated HMA granules at a higher speed than the speed at which they would move by themselves if not forced by the pushers. Said pusher fingers provided on the chain conveyor may be mounted along the roller conveyor (13).

Figure 9:
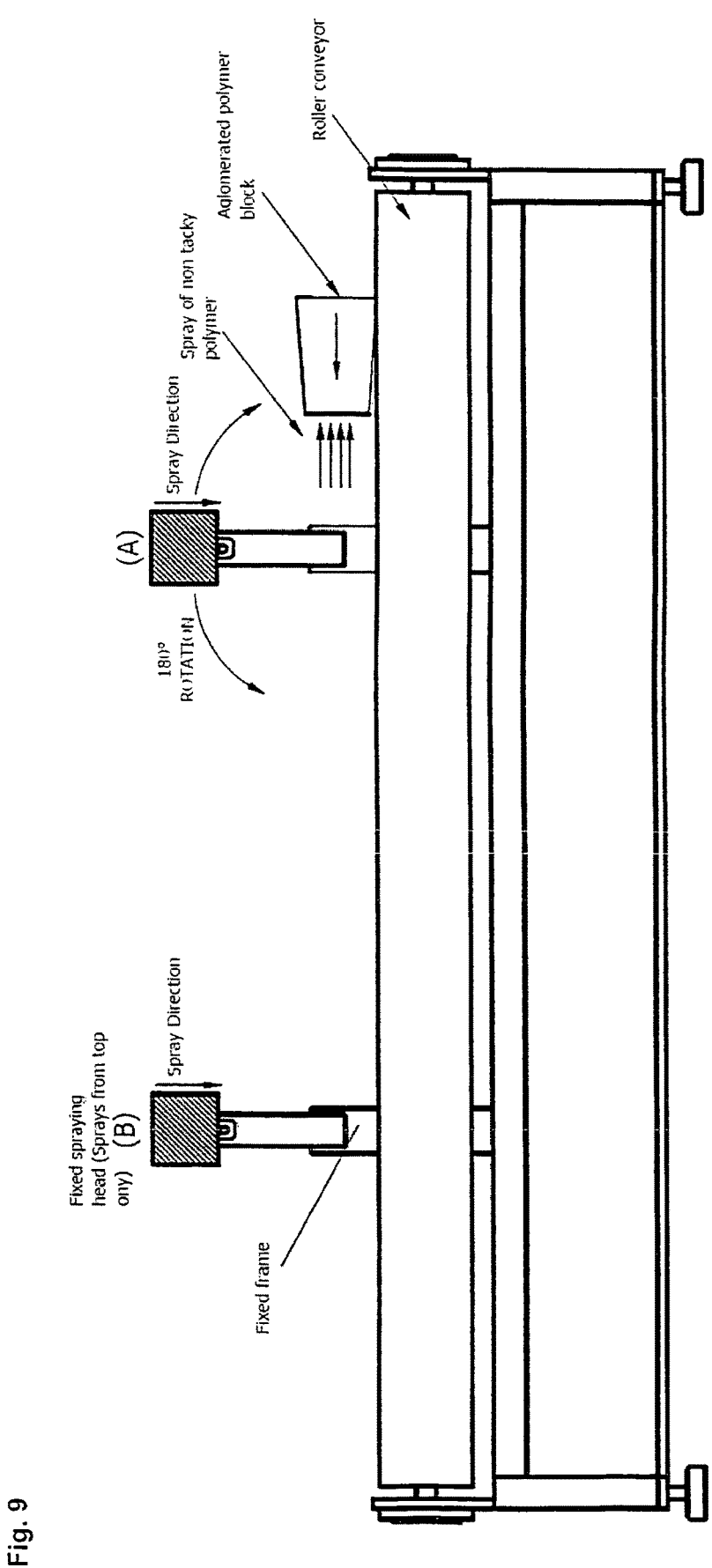
FIG. 9 is a side view of the spraying means (10) shown in FIG. 8.
Figure 10C:
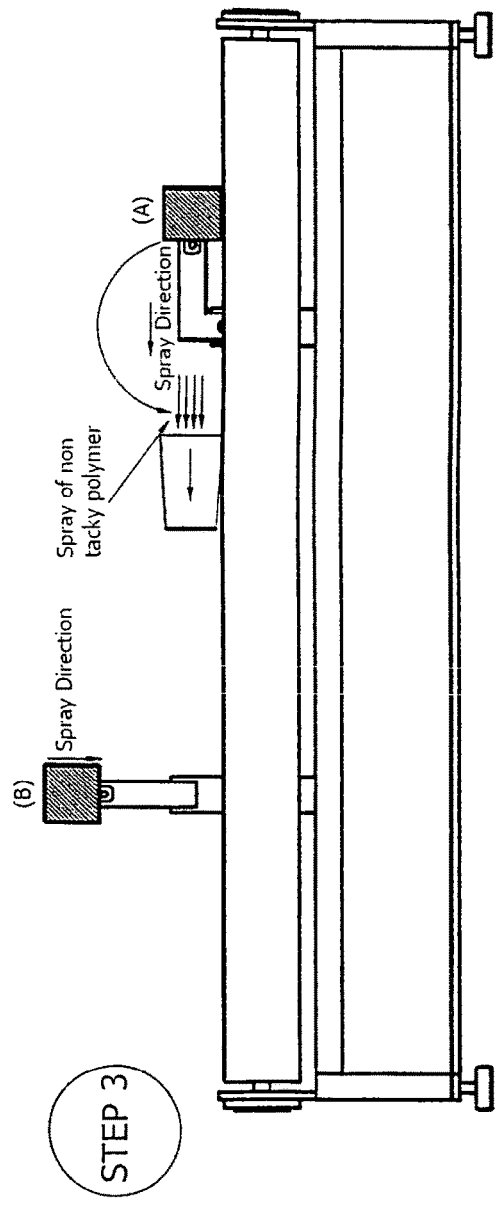
Figure 10D:
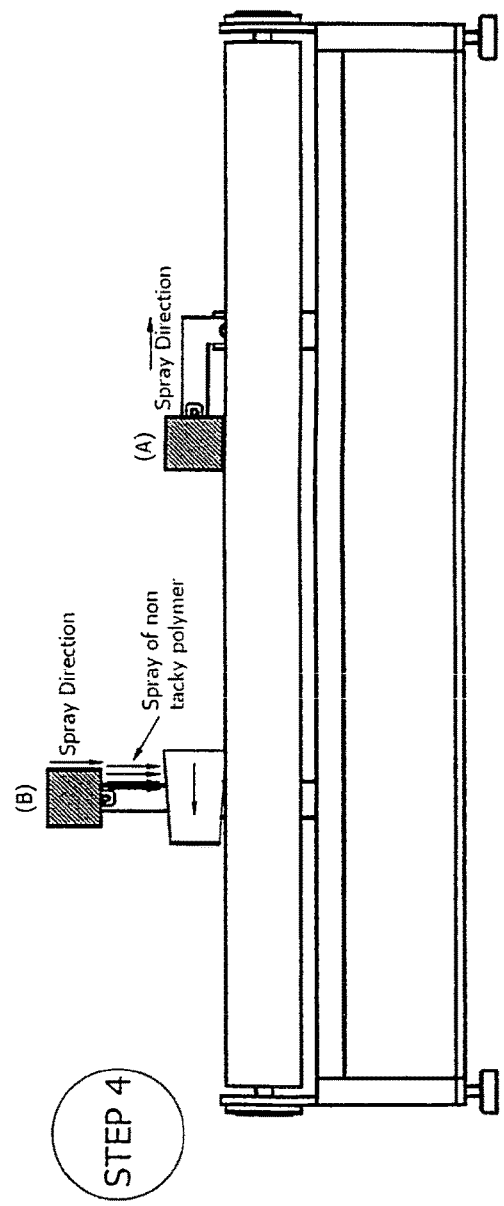

As mentioned above, the spraying units (A, B) preferably comprise at least one spraying unit including a swivelling spraying head which is rotatable by at least 90° between horizontal and vertical positions, in which the coating material is horizontally sprayed in a horizontal position of the at least one spraying head onto the surface of the bases of the truncated cone-shaped block of agglomerated HMA granules, and in which the coating material is vertically sprayed in a vertical position of the at least one spraying head onto the lateral area of the truncated cone-shaped block of agglomerated HMA granules. In particular, according to a preferred embodiment, the spraying units (A and B) comprise a first spraying unit (A) including a swivelling spraying head which is rotatable by approximately 180° between horizontal positions. As shown in FIG. 9, the first spraying unit (A) includes a spraying head mounted on a swivelling arm. Initially, the spraying head of the first spraying unit (A) resides in a horizontal position in which the coating material (simply referred to as "non tacky polymer" in FIGS. 9 and 10A to 10D) is horizontally sprayed onto the surface of the base of the oncoming truncated cone-shaped block of agglomerated HMA granules (i.e. one of the two bases, depending on which one arrives first). Upon rotation of the swivelling arm to a vertical position, the coating material is vertically sprayed onto the lateral area of the truncated cone-shaped block of agglomerated HMA granules which is still both in rotation and in forward motion. Upon further movement of the HMA block through the first spraying unit (A), the swivelling arm further rotates to a second horizontal position so that the coating material is horizontally sprayed onto the surface of the second base (rear end) of the truncated cone-shaped block of agglomerated HMA granules.

Preferably, the spraying units (A and B) further comprise an optional, second fixed vertical spraying head (B) mounted after the first spraying unit (A). Here, the HMA block which has been sprayed all over and is still in forward motion reaches the fixed vertical spraying head (B), where it may (or may not) be sprayed again, just from the top, to apply a second coating layer to the surface of the HMA block, if necessary.

The above spraying steps are also illustrated in FIGS. 10A to 10D.

Step 1:

The spraying head (A) is lying parallel to the roller conveyor (13) and is facing the front end (first or top base) of the oncoming HMA block with its horizontal axis aligned with that of the HMA block. As the polymer block reaches a distance between 200 to 400 mm from the spraying head (A), the spray is started and goes on for a predetermined time (for example 1 to 5 seconds) to have the full surface of the first/top base covered with the non-stick coating material and then stops spraying.

Step 2:

While the polymer block is still in forward motion, the swivelling arm carrying the spraying head (A) is rotated by 90° to the vertical position. As the HMA block comes underneath this spraying head, the spraying head (A) starts to spray again to cover the lateral area of the HMA block which is both rotating and moving forward.

Step 3:

As the polymer block is exiting from underneath the spraying head (A) which is in the vertical position, the swivelling arm rotates the spraying head (A) by another 90° to reside again in an horizontal position (opposite to the one in Step 1), to spray for a predetermined time (for example 1 to 5 seconds) the HMA block from behind, in order to cover its rear surface (second base) so that top, bottom and lateral surfaces of the block are covered with the non-stick coating material.

Step 4:

The HMA block which has been sprayed all over and is still in forward motion reaches the fixed vertical spraying head (B), where it may (or may not) be sprayed again, just from the top, to apply a second coating layer to the lateral area, if necessary. In the meantime, spraying head (A) is rotated back to its original position, ready to face the next oncoming HMA block.

Upon exiting the spraying means (10), the blocks of HMA material have a totally tack-free outer surface and can be handled and packed like non-sticky materials. As described above, the coating material may be applied by the swivelling spraying head intermittently, according to which the spaying stops at the time when the spraying head changes its position. However, the coating material may also be continuously applied without stopping spraying.

According to another preferred embodiment, instead of having the spraying head (A) spraying the front, rear and lateral (side) surfaces of the block of agglomerated HMA granules, the spraying units (A, B) comprise a first spraying unit (A) including a swivelling spraying head which is rotatable by at least 90° between horizontal and vertical positions, and a second spraying unit (B) including a swivelling spraying head which is rotatable by at least 90° between horizontal and vertical positions, wherein the coating material is horizontally sprayed in a horizontal position of the spraying heads onto the surface of the bases of the truncated cone-shaped block of agglomerated HMA granules, and wherein the coating material is vertically sprayed in a vertical position of the spraying heads onto the lateral area of the truncated cone-shaped block of agglomerated HMA granules. In such a case, the spraying operation is shared by spraying heads (A) and (B), making them both to swivel by preferably 90° each (in opposite direction to each other) to equally share the spraying operation and complete it at a faster speed.

For example, the spraying units (A, B) comprise two spraying units each including a swivelling spraying head, both of which are rotatable by 90° between horizontal and vertical positions, in which the coating material is first sprayed onto the lateral area of the truncated cone-shaped block of agglomerated HMA granules while the HMA block is passing through the first spraying unit (A). Then, the swivelling spraying head of the first spraying unit (A) rotates 90° to its horizontal position in order to spray the rear end (second or bottom base) after the block passes through it. The second spraying unit (B) in its horizontal position sprays the front end (first or top base) of the HMA block as it approaches in forward motion and then takes its vertical position by rotating 90° to spray onto the lateral surface of the HMA block in order to apply a second coating layer. Upon exiting the spraying means (10), the blocks of HMA material have a totally tack-free outer surface and can be handled and packed like non-sticky materials.

The invention claimed is:

1. A process for producing a hot melt adhesive (HMA) material having a coating, wherein the coating has a tack-free property up to 50° C., the process comprising:

moulding cold HMA granules into a solid, moulded block of agglomerated HMA granules, wherein the moulded block of agglomerated HMA granules has a truncated cone shape; and a liquid or molten coating material at least partially to top, bottom and lateral surfaces of the moulded block of agglomerated HMA granules,
wherein the surfaces of the moulded block of agglomerated HMA granules are continuously coated with the coating material while the moulded block of agglomerated HMA granules is being rotated.

2. The process according to claim 1, wherein the HMA granules are compressed under mechanical pressure into the moulded block of agglomerated HMA granules.

3. The process according to claim 1, wherein a surface temperature of the HMA granules in the moulding step ranges from 0° C. to 30° C.

4. The process according to claim 1, wherein in the spraying step of applying the coating material, a surface temperature of the moulded block of agglomerated HMA granules ranges from −20° C. to 40° C.

5. The process according to claim 1, wherein in the step of applying the coating material, the moulded block of agglomerated HMA granules is moved in a longitudinal direction upon rotation of a pair of rotating rollers providing a continuous coating while being in forward motion on the rollers.

6. The process according to claim 1, wherein the coating material is continuously or intermittently applied using at least one swivelling spraying head, the process further comprising horizontally spraying the coating material onto a surface of a top and bottom base of the moulded block of agglomerated HMA granules, while the at least one spraying head is in horizontal positions, and upon rotation of the at least one spraying head to a vertical position, vertically spraying the coating material onto the lateral surface of the moulded block of agglomerated HMA granules while the moulded block of agglomerated HMA granules is being rotated.

7. The process according to claim 1, wherein the coating material is continuously or intermittently applied using two swivelling spraying heads, wherein the coating material is first vertically sprayed onto the lateral surface of the moulded block of agglomerated HMA granules by a first spraying head in a vertical position while the moulded block of agglomerated HMA granules is being rotated, upon rotation of the first spraying head to a horizontal position, horizontally sprayed onto the surface of a second base of the moulded block of agglomerated HMA granules, horizontally sprayed onto the surface of a first base of the moulded block of agglomerated HMA granules by a second spraying head in a horizontal position, and upon rotation of the second spraying head to a vertical position, vertically sprayed onto the lateral surface of the moulded block of agglomerated HMA granules.

8. A HMA material having a coating and obtainable by the process according to claim 1, wherein the coating has a tack-free property up to 50° C.

9. A device for producing a hot melt adhesive (HMA) material having a coating, wherein the coating has a tack-free property up to 50° C., the device comprising moulding means for moulding HMA granules into a moulded block of agglomerated HMA granules, wherein the moulded block of agglomerated HMA granules has a truncated cone-shape, and spraying means for applying a coating material present in liquid or molten form at least partially to a surface of the moulded block of agglomerated HMA granules present in solid form,
wherein the moulding means comprises a mould having an open top and an open bottom, a movable disc forming a bottom lid and a movable compressor/extractor disc for compressing the HMA granules from the top of the mould in a state in which the disc closes the bottom of the mould while it is being filled and for moving the moulded block of agglomerated HMA granules present in solid form through the bottom of the mould via the pressure of the compressor/extractor disc, wherein the inner diameter of the bottom of the mould is larger than the inner diameter of the top of the mould.

10. The device according to claim 9, wherein the movable disc has a circular recess on the surface facing the mould having a rounded edge, wherein a diameter of the recess corresponds to an inner diameter of a bottom of the mould.

11. The device according to claim 10, wherein the rounded edge has a curvature radius (r) which is equal to an average radius of the HMA granules.

12. The device according to claim 9, wherein the spraying means comprises at least two spraying units adapted to provide the coating material onto the surface of the moulded block of agglomerated HMA granules while the moulded block of agglomerated HMA granules is being rotated, wherein the spraying units comprise vertically and horizontally spraying nozzles.

13. The device according to claim 9, wherein the spraying means comprises at least one pair of rotating rollers for rotating the moulded block of agglomerated HMA granules located on the rollers.

14. The device according to claim 13, wherein the at least one pair of rollers is adapted to rotate the moulded block of agglomerated HMA granules while moving the moulded block of agglomerated HMA granules through the spraying units.

15. The device according to claim 14, further comprising pusher fingers provided on a chain conveyor to push forward the moulded block of agglomerated HMA granules rotating on the pair of rollers.

16. The device according to claim 12, wherein the spraying units comprise at least one spraying unit including a swivelling spraying head which is rotatable by at least 90° between horizontal and vertical positions, in which the coating material is horizontally sprayed in a horizontal position of the at least one spraying head onto the surface of the bases of the moulded block of agglomerated HMA granules, and in which the coating material is vertically sprayed in a vertical position of the at least one spraying head onto a lateral surface of the moulded block of agglomerated HMA granules.

17. The device according to claim 12, wherein the spraying units comprise a first spraying unit including a swivelling spraying head which is rotatable by at least 90° between horizontal and vertical positions, and a second spraying unit including a swivelling spraying head which is rotatable by at least 90° between horizontal and vertical positions, wherein the coating material is horizontally sprayed in a horizontal position of the spraying heads onto the surface of the bases of the moulded block of agglomerated HMA granules, and wherein the coating material is vertically sprayed in a vertical position of the spraying heads onto a lateral surface of the moulded block of agglomerated HMA granules.

* * * * *